(12) United States Patent
Davis et al.

(10) Patent No.: US 8,742,039 B2
(45) Date of Patent: Jun. 3, 2014

(54) METHODS FOR MAKING POLYOLEFINS

(75) Inventors: Mark B. Davis, Lake Jackson, TX (US); Sun-Chueh Kao, Pearland, TX (US); Tae Hoon Kwalk, Belle Mead, NJ (US)

(73) Assignee: Univation Technologies, LLC, Houston, TX (US)

( * ) Notice: Subject to any disclaimer, the term of this patent is extended or adjusted under 35 U.S.C. 154(b) by 365 days.

(21) Appl. No.: 12/743,463

(22) PCT Filed: Nov. 19, 2008

(86) PCT No.: PCT/US2008/012898
§ 371 (c)(1),
(2), (4) Date: May 18, 2010

(87) PCT Pub. No.: WO2009/067201
PCT Pub. Date: May 28, 2009

(65) Prior Publication Data
US 2010/0249355 A1   Sep. 30, 2010

Related U.S. Application Data

(60) Provisional application No. 61/003,792, filed on Nov. 20, 2007.

(51) Int. Cl.
*C08F 4/654* (2006.01)
*C08F 4/64* (2006.01)
*C08F 4/6592* (2006.01)
*C08L 23/08* (2006.01)

(52) U.S. Cl.
USPC ........... 526/113; 526/160; 526/161; 526/943; 525/191; 525/240

(58) Field of Classification Search
USPC ........... 526/113, 160, 161, 943; 525/191, 240
See application file for complete search history.

(56) References Cited

U.S. PATENT DOCUMENTS

| 7,601,783 B2 * | 10/2009 | Davis et al. .......... 525/191 |
| 2005/0085600 A1 | 4/2005 | Ehrman et al. |

FOREIGN PATENT DOCUMENTS

| WO | WO01/30862 | 5/2001 |
| WO | WO 2005/100414 | 10/2005 |

* cited by examiner

*Primary Examiner* — Caixia Lu
(74) *Attorney, Agent, or Firm* — Jennifer A. Schmidt; Kristina Leavitt

(57) ABSTRACT

A method for making a polyolefin composition according to one embodiment includes altering the concentration of the chain transfer agent present in the reactor to control the HMW and LMW fractions of the polyolefin composition.

20 Claims, 6 Drawing Sheets

METHODS FOR MAKING POLYOLEFINS

CROSS REFERENCE TO RELATED APPLICATIONS

This application is a National Stage entry under 35 U.S.C. 371 of International Application No. PCT/US2008/012898, filed Nov. 19, 2008, and claims the benefit of Ser. No. 60/003,792, filed Nov. 20, 2007, the disclosure of which is incorporated by reference.

FIELD OF THE INVENTION

The present invention relates to polyolefin production, and more particularly, the invention relates to controlling product properties during the polymerization of polyolefins.

BACKGROUND

The term "bimodal" or "multimodal" as applied to polyolefin resins usually means that the resin has at least two distinct ranges of molecular weight that may impart desired properties to the product in great variety. Bimodal resins were typically made in two separate reactors connected in series, for example, a product having a first molecular weight was moved directly from a first reaction zone in which it was made and introduced to a second reaction zone usually providing different polymerization conditions for making a polymer composition. Two-stage processes are difficult to control and, perhaps more important, have a capital disadvantage. Moreover, frequently the polymer products are not homogeneously mixed in that at least some particles are entirely of one modality or the other. It is therefore desirable to find ways of making homogeneous bimodal polyolefins in a single reactor.

Alternatively, one approach to making bimodal polyolefin compositions in a single reactor has been to employ a mixed catalyst system, in which one catalyst component makes a primarily low molecular weight (LMW) product and the other catalyst component produces a primarily high molecular weight (HMW). For example, bimodal catalysts are often used to co-polymerize polymers having two average molecular weights using a single catalyst system. By including both of these catalyst components in the same catalyst system, a bimodal product can be produced. The polymer having different molecular weights are mixed at the molecular level providing a polymer product that is relatively free of gels compared to similar products made in staged-reactor or series-reactor processes or by the blending of two distinct unimodal resins.

Controlling the ratio of the components in the bimodal polymer product or composition is a significant manufacturing concern. Product properties of bimodal resins are often sensitive to component split. For instance, in the manufacture of high-density, high-molecular-weight film, to achieve the desired specification may require control of component split within about 2% of the setpoint.

The weight percentage or "split" of the HMW and LMW in the total polymer product is greatly influenced by the relative amount of each type of catalyst in the catalyst system. While theoretically, a catalyst system containing proper amounts of each catalyst could be generated and used to produce the desired split in a particular case, in practice using such a system would be difficult, as the relative productivities of the catalyst components can change with variations in reactor conditions or poison levels.

A technique for changing the flow properties of a bimodal resin is by changing the resin component split, or weight fraction of the HMW component in the product. By modifying the relative amounts of HMW and LMW components in the resin, flow properties can be changed as well. Unfortunately, in some cases changing the split affects more than one variable. In some products, changing the HMW split by a few percent can significantly affect both resin flow index and Melt Flow Ratio (MFR).

MFR is a ratio of two different melt flow index measurements, and is used to quantify the shear-thinning of the polymer. As is well known, melt flow index measurements measure the rate of extrusion of thermoplastics through an orifice at a prescribed temperature and load, and are often used as a means to discern molecular weight of the overall polymer.

Generally, it has been believed in the art that reducing hydrogen concentration during polymerization using a bimodal catalyst system would increase product MFR by increasing the spread of the HMW and LMW product components.

SUMMARY

The present invention is broadly directed to various systems and methods for producing, and/or controlling properties of a polyolefin product.

A method for making a polyolefin composition according to one embodiment includes contacting one or more olefinic monomers in a single reactor containing a bicomponent catalyst system comprising a first catalyst component and a second catalyst component each having a catalyst productivity and a chain transfer agent response; the single reactor having a chain transfer agent concentration; the chain transfer agent response of the second catalyst component having a different sensitivity than that of the first catalyst component; effectuating the polymerization of the olefinic monomers to produce an olefin polymer having a melt flow ratio; wherein the first catalyst component produces a high molecular weight (HMW) fraction of the polymer, and the second catalyst component produces a low molecular weight (LMW) fraction of the polymer; altering the concentration of the chain transfer agent present in the reactor to move peaks of the HMW and LMW fractions of the polymer in a same direction, the altering also causing the melt flow ratio of the polymer to change in a first direction; and adjusting at least one condition in the reactor to achieve a molecular weight split where the melt flow ratio change reverses direction.

A method for making a polyolefin composition according to another embodiment includes contacting one or more olefinic monomers in a single reactor containing a bicomponent catalyst system comprising a first catalyst component and a second catalyst component each having a catalyst productivity and a chain transfer agent response; the single reactor having a chain transfer agent concentration; the chain transfer agent response of the second catalyst component having a different sensitivity than that of the first catalyst component; and effectuating the polymerization of the olefinic monomers to produce an olefin polymer having a melt flow ratio and a flow index; wherein the first catalyst component produces a high molecular weight (HMW) fraction of the polymer, and the second catalyst component produces a low molecular weight (LMW) fraction of the polymer; wherein reducing the concentration of the chain transfer agent present in the reactor while maintaining about a constant flow index causes the melt flow ratio to decrease.

A method for making a polyethylene composition suitable for blow molding according to another embodiment includes contacting at least ethylene in a single reactor with a bicomponent catalyst system comprising a first catalyst component and a second catalyst component each having a catalyst productivity and a hydrogen response; the single reactor having a hydrogen concentration; the chain transfer agent response of the second catalyst component having a different sensitivity than that of the first catalyst component; and effectuating the polymerization of the ethylene to produce polyethyelene having a melt flow ratio and a flow index; wherein the first catalyst component produces a high molecular weight (HMW) fraction of the polyethylene, and the second catalyst component produces a low molecular weight (LMW) fraction of the polyethylene; wherein reducing the concentration of the hydrogen present in the reactor while maintaining about a constant flow index causes the melt flow ratio to decrease.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like. The following description is made for the purpose of illustrating the general principles of the present invention and is not meant to limit the inventive concepts claimed herein. Further, particular features described herein can be used in combination with other described features in each of the various possible combinations and permutations.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless otherwise noted.

The present invention is broadly directed to various systems and methods for controlling properties of a multi-component polyolefin product.

Figure 1:
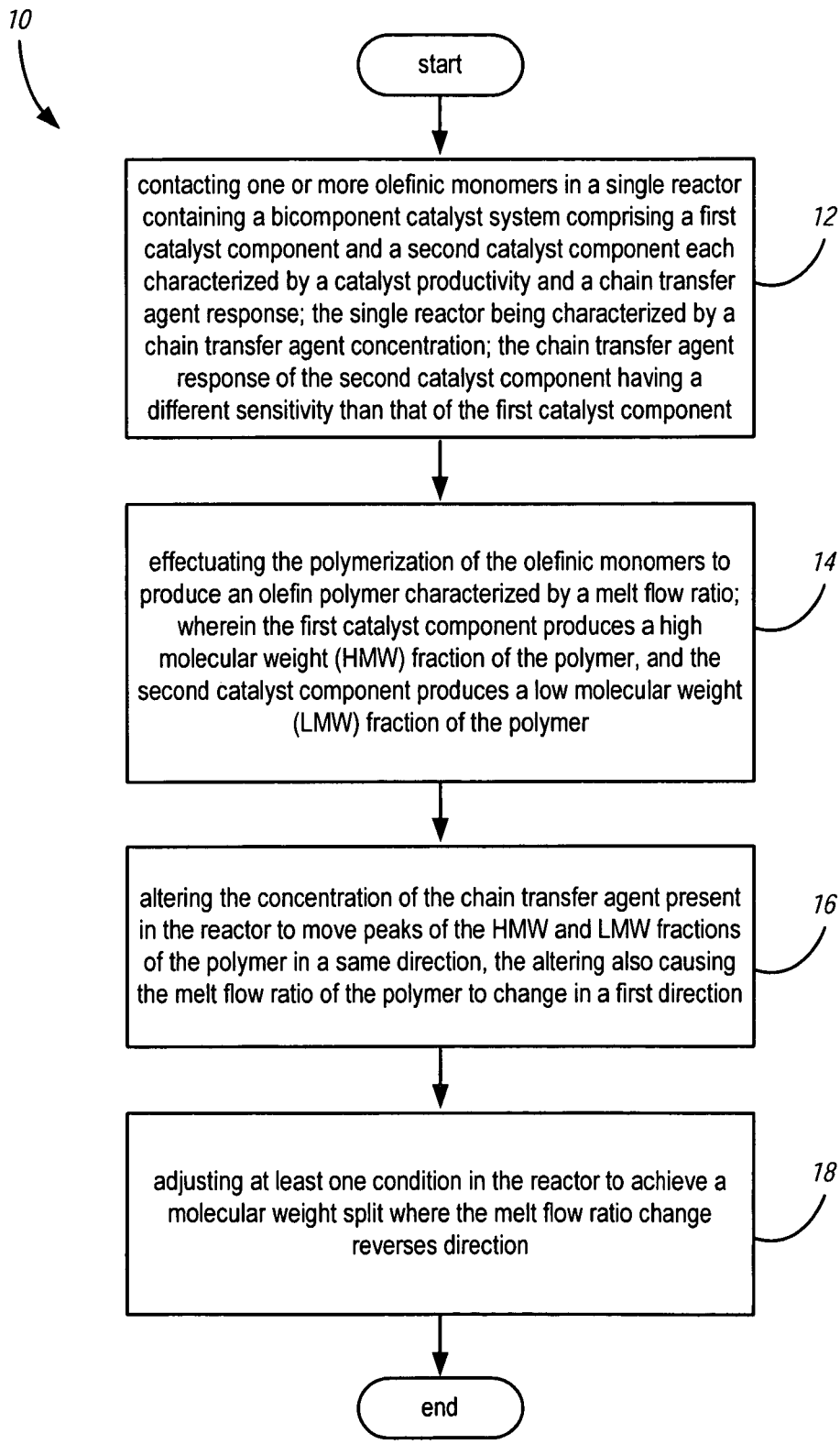
FIG. 1 is a schematic representation of the general methods, systems and/or apparatus of certain embodiments of the invention.

A general method 10 for making a polyolefin can be described, for example, with reference to FIG. 1, in which, in step 12, one or more olefinic monomers are contacted in a single reactor containing a bicomponent catalyst system comprising a first catalyst component and a second catalyst component each having a catalyst productivity and a chain transfer agent response; the single reactor being having a chain transfer agent concentration; the chain transfer agent response of the second catalyst component having a different sensitivity than that of the first catalyst component. In step 14, the polymerization of the olefinic monomers is effectuated to produce an olefin polymer having a melt flow ratio; wherein the first catalyst component produces a high molecular weight (HMW) fraction of the polymer, and the second catalyst component produces a low molecular weight (LMW) fraction of the polymer. In step 16, the concentration of the chain transfer agent present in the reactor is altered to move peaks of the HMW and LMW fractions of the polymer in a same direction, the altering also causing the melt flow ratio of the polymer to change in a first direction. In step 18, at least one condition in the reactor is adjusted to achieve a molecular weight split where the melt flow ratio change reverses direction.

Figure 2:
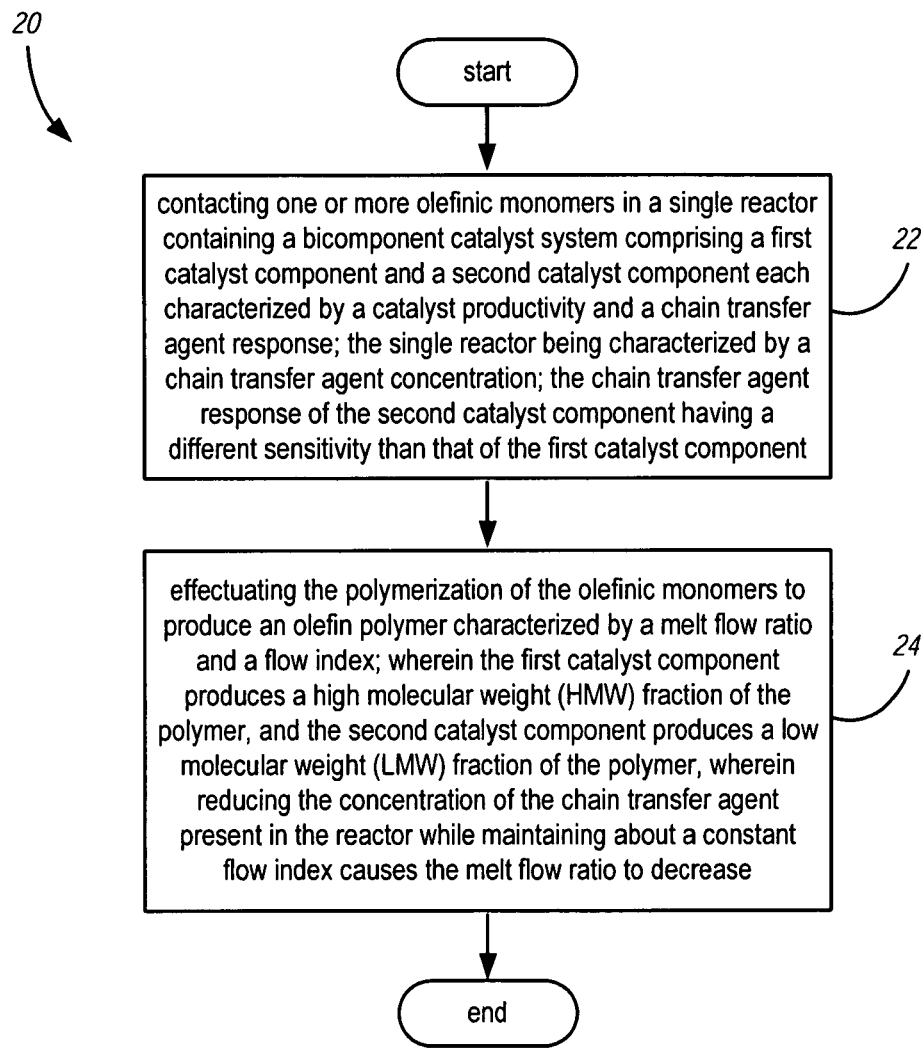
FIG. 2 is a schematic representation of the general methods, systems and/or apparatus of certain embodiments of the invention.

A general method 20 for making a polyolefin can be described, for example, with reference to FIG. 2, in which, in step 22, one or more olefinic monomers are contacted in a single reactor containing a bicomponent catalyst system comprising a first catalyst component and a second catalyst component each having a catalyst productivity and a chain transfer agent response; the single reactor being having a chain transfer agent concentration; the chain transfer agent response of the second catalyst component having a different sensitivity than that of the first catalyst component. In step 24, the polymerization of the olefinic monomers is effectuated to produce an olefin polymer having a melt flow ratio and a flow index; wherein the first catalyst component produces a high molecular weight (HMW) fraction of the polymer, and the second catalyst component produces a low molecular weight (LMW) fraction of the polymer. Reducing the concentration of the chain transfer agent present in the reactor while maintaining about a constant flow index causes the melt flow ratio to decrease.

Figure 3:
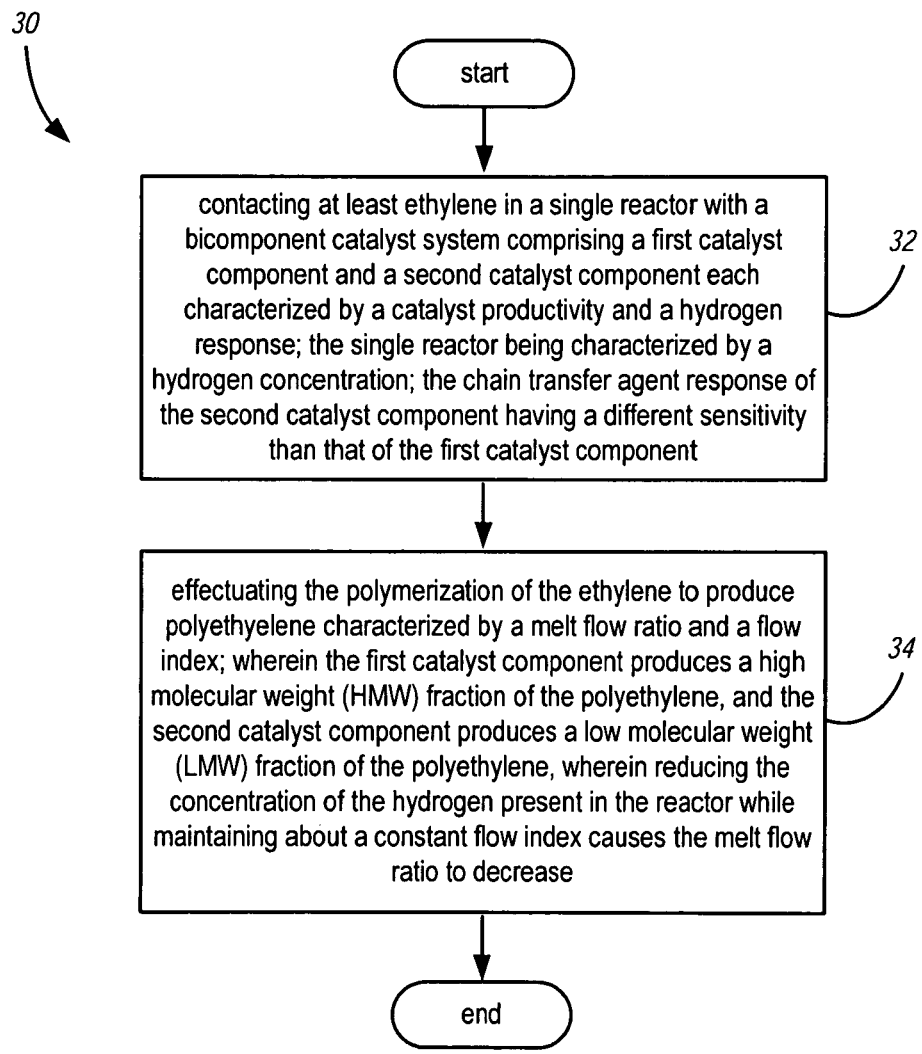
FIG. 3 is a schematic representation of the general methods, systems and/or apparatus of certain embodiments of the invention.

A general method 30 for making a polyethylene suitable for blow molding can be described, for example, with reference to FIG. 3, in which, in step 32, at least ethylene is contacted in a single reactor with a bicomponent catalyst system comprising a first catalyst component and a second catalyst component each having a catalyst productivity and a hydrogen response; the single reactor being having a hydrogen concentration; the chain transfer agent response of the second catalyst component having a different sensitivity than that of the first catalyst component. In step 34, the polymerization of the ethylene is effectuated to produce polyethyelene having a melt flow ratio and a flow index; wherein the first catalyst component produces a high molecular weight (HMW) fraction of the polyethylene, and the second catalyst component produces a low molecular weight (LMW) fraction of the polyethylene. Reducing the concentration of the hydrogen present in the reactor while maintaining about a constant flow index causes the melt flow ratio to decrease.

Further details of making polyolefins, including specific apparatuses adapted therefore, are described below, and each of the below-described details are specifically considered in various combination with these and other generally preferred approaches described herein.

While the present invention is applicable to gas phase polyolefin production, the broad concepts and teachings herein also have applicability to many types of processes, including but not limited to, gas phase, gas/solid phase, liquid/solid phase, gas/liquid phase, and gas/liquid/solid phase catalyst reactor systems including polymerized catalyst reactor systems; gas phase, gas/solid phase, liquid/solid phase, gas/liquid phase, and gas/liquid/solid phase batch charge preparation systems; etc.

For ease of understanding of the reader, as well as to place the various embodiments of the invention in a context, much of the following description shall be presented in terms of a commercial, gas phase polyethylene production system. It should be kept in mind that this is done by way of non-limiting example only.

Using the methods and systems as described herein results in reliable, commercially useful and cost effective continuous polyolefin production. Further, using the methodology presented herein results in polymers with heretofore unavailable physical properties.

The methods described herein may be useful in any reaction process, including polymerization process, solution, slurry, and high pressure processes. The invention in one aspect creates a polymer suitable for blow molding, with heretofore unavailable properties.

Polymerization Process

In each of the aforementioned generally preferred approaches and/or embodiments, the polymers can be made in a variety of processes, including but not limited to, gas phase, gas/solid phase, liquid/solid phase, gas/liquid phase, and gas/liquid/solid phase reactor systems including polymerization reactor systems; gas phase, gas/solid phase, liquid/solid phase, gas/liquid phase, and gas/liquid/solid phase mass transfer systems; gas phase, gas/solid phase, liquid/solid phase, gas/liquid phase, and gas/liquid/solid phase mixing systems; gas phase, gas/solid phase, liquid/solid phase, gas/liquid phase, and gas/liquid/solid phase heating or cooling systems; gas/solid phase and gas/solid/liquid phase drying systems; etc.

Fluidized Bed Polymerization Reactor Systems

In each of the aforementioned generally preferred approaches and/or embodiments, the reactor may form part of a fluidized bed polymerization reactor system. Gas phase polymerization reactions may be carried out in fluidized bed polymerization reactors, and can also be formed in stirred or paddle-type reactor systems (e.g., stirred bed systems) which include solids in a gaseous environment. While the following discussion will feature fluidized bed systems, where the present invention has been found to be preferred and especially advantageous, it is to be understood that the general concepts relating to the use of continuity additives containing a scavenger, which are discussed relevant to the preferred fluidized bed systems, are also adaptable to the stirred or paddle-type reactor systems as well.

A fluidized bed can generally include a bed of particles in which the static friction between the particles is disrupted. In each of the aforementioned generally preferred approaches and/or embodiments, the fluidized bed system can be an open fluidized bed system or a closed fluidized bed system. An open fluidized bed system can comprise one or more fluids and one or more types of fluidized solid particles and having one or more fluidized bed surfaces that are exposed to an open uncontrolled atmosphere. For example, an open fluidized bed system can be an open container such as an open-top tank or an open well of a batch reactor or of a parallel batch reactor (e.g., microtiter chamber). Alternatively, the fluidized bed system can be a closed fluidized bed system. A closed fluidized bed system can comprise one or more fluids and one or more types of fluidized particles that are generally bounded by a barrier so that the fluids and particles are constrained. For example, a closed fluidized bed system may include a pipeline (e.g., for particle transport); a recirculating fluidized bed system, such as the fluidized bed polymerization reactor system of FIG. 4; any of which may be associated with various residential, commercial and/or industrial applications.

A closed fluidized bed system can be in fluid communication with an open fluidized bed system. The fluid communication between a closed fluidized bed system and an open fluidized bed system can be isolatable, for example, using one or more valves. Such isolation valves can be configured for unidirectional fluid flow, such as for example, a pressure relief valve or a check valve. In general, the fluidized bed system (whether open or closed) can be defined by manufactured (e.g., man-made) boundaries comprising one or more barriers. The one or more barriers defining manufactured boundaries can generally be made from natural or non-natural materials. Also, in general, the fluidized bed system (whether open or closed) can be a flow system such as a continuous flow system or a semi-continuous flow (e.g., intermittent-flow) system, a batch system, or a semi-batch system (sometimes also referred to as a semi-continuous system). In many instances, fluidized bed systems that are flow systems are closed fluidized bed systems.

The fluidized bed in preferred embodiments is generally formed by flow of a gaseous fluid in a direction opposite gravity. The frictional drag of the gas on the solid particles overcomes the force of gravity and suspends the particles in a fluidized state referred to as a fluidized bed. To maintain a viable fluidized bed, the superficial gas velocity through the bed must exceed the minimum flow required for fluidization. Increasing the flow of the fluidizing gas increases the amount of movement of the particles in the bed, and can result in a beneficial or detrimental tumultuous mixing of the particles. Decreasing the flow results in less drag on the particles, ultimately leading to collapse of the bed. Fluidized beds formed by gases flowing in directions other than vertically include particles flowing horizontally through a pipe, particles flowing downwardly e.g., through a downcomer, etc.

Fluidized beds can also be formed by vibrating or otherwise agitating the particles. The vibration or agitation keeps the particles in a fluidized state.

Figure 4:
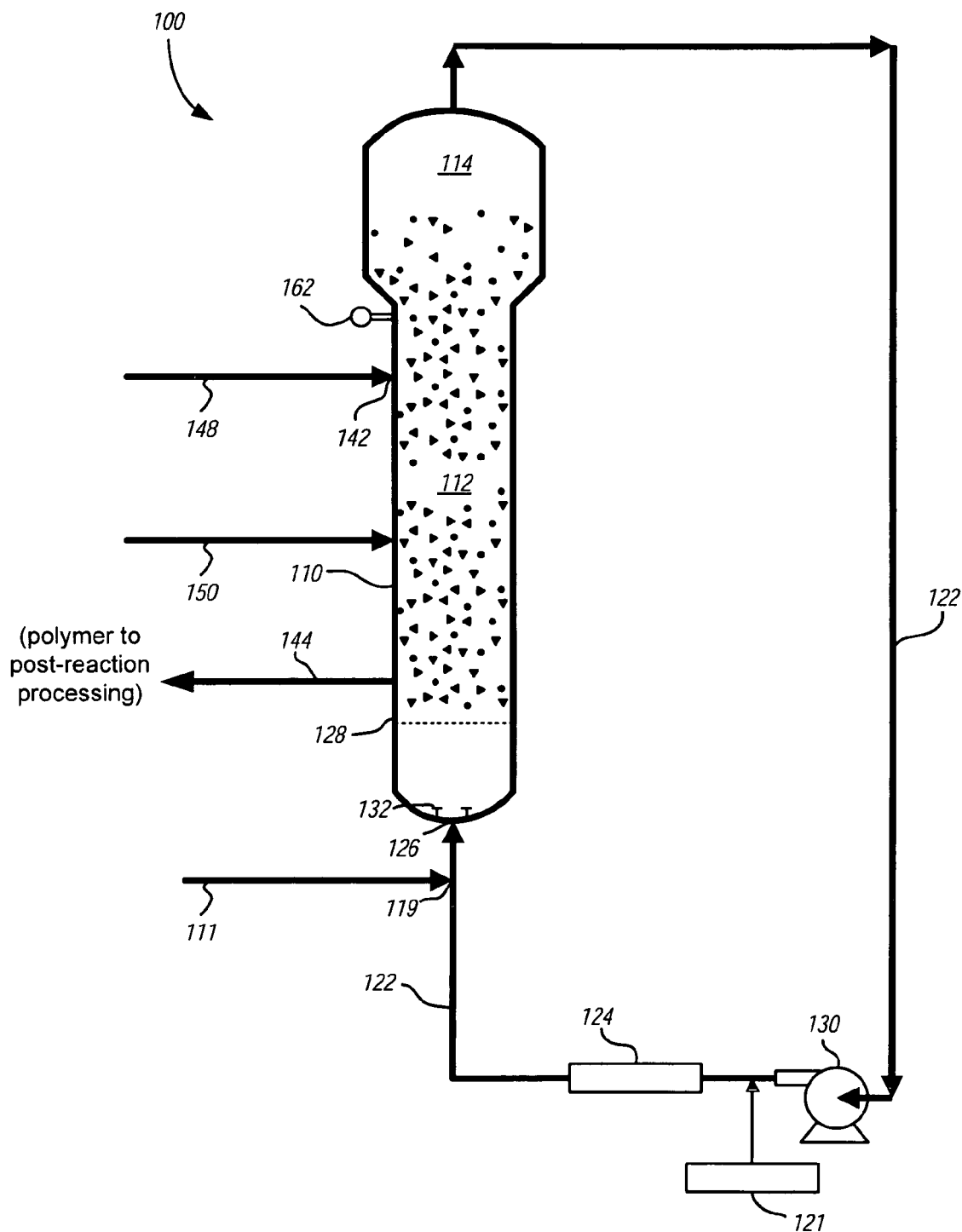
FIG. 4 is a schematic representation of the general methods, systems and/or apparatus of certain embodiments of the invention illustrating implementation in a gas phase polymerization reactor system.

In very general terms, a conventional fluidized bed polymerization process for producing resins and other types of polymers is conducted by passing a gaseous stream containing one or more monomers continuously through a fluidized bed reactor under reactive conditions and in the presence of catalyst at a velocity sufficient to maintain the bed of solid particles in a suspended condition. A continuous cycle is employed where the cycling gas stream, otherwise known as a recycle stream or fluidizing medium, is heated in the reactor by the heat of polymerization. The hot gaseous stream, also containing unreacted gaseous monomer, is continuously withdrawn from the reactor, compressed, cooled and recycled into the reactor. Product is withdrawn from the reactor and make-up monomer is added to the system, e.g., into the recycle stream or reactor, to replace the polymerized monomer. See for example U.S. Pat. Nos. 4,543,399, 4,588,790, 5,028,670, 5,317,036, 5,352,749, 5,405,922, 5,436,304, 5,453,471, 5,462,999, 5,616,661, 5,668,228, and 6,689,847 all of which are fully incorporated herein by reference. A basic, conventional fluidized bed system is illustrated in FIG. 4. The reactor vessel 110 (also referred to herein a "reactor") comprises a reaction zone 112 and a velocity reduction zone 114. While a reactor configuration comprising a generally cylindrical region beneath an expanded section is shown in FIG. 4, alternative configurations such as a reactor configuration comprising an entirely or partially tapered reactor may also be utilized. In such configurations, the fluidized bed can be located within a tapered reaction zone but below a region of greater cross-sectional area which serves as the velocity reduction zone of the more conventional reactor configuration shown in FIG. 4.

The reaction zone 112 includes a bed of growing polymer particles, formed polymer particles and a minor amount of catalyst all fluidized by the continuous flow of polymerizable and modifying gaseous components, including inerts, in the form of make-up feed and recycle fluid through the reaction zone. To maintain a viable fluidized bed, the superficial gas velocity through the bed must exceed the minimum flow required for fluidization which is typically from about 0.2 to about 0.5 ft/sec. for polyolefins. Preferably, the superficial gas velocity is at least 0.2 ft/sec above the minimum flow for fluidization or from about 0.4 to about 0.7 ft/sec. Ordinarily, the superficial gas velocity will not exceed 5.0 ft/sec and is usually no more than about 2.8 ft/sec.

On start-up, the reactor is generally charged with a bed of particulate polymer particles before gas flow is initiated. Such particles help to prevent the formation of localized "hot spots" when catalyst feed is initiated. They may be the same as the polymer to be formed or different. When different, they are preferably withdrawn with the desired newly formed polymer particles as the first product. Eventually, a fluidized bed consisting of desired polymer particles supplants the start-up bed.

Fluidization is achieved by a high rate of fluid recycle to and through the bed, typically on the order of about 50 times the rate of feed or make-up fluid. This high rate of recycle provides the requisite superficial gas velocity necessary to maintain the fluidized bed. The fluidized bed has the general appearance of dense mass of individually moving particles as created by the percolation of gas through the bed. The pressure drop through the bed is equal to or slightly greater than the weight of the bed divided by the cross-sectional area.

Referring again to FIG. 4, make-up fluids can be fed at point 119 via feed line 111 and recycle line 122. The composition of the recycle stream is typically measured by a gas analyzer 121 and the composition and amount of the make-up stream is then adjusted accordingly to maintain an essentially steady state composition within the reaction zone. The gas analyzer 121 can be positioned to receive gas from a point between the velocity reduction zone 114 and heat exchanger 124, preferably, between compressor 130 and heat exchanger 124.

To ensure complete fluidization, the recycle stream and, where desired, at least part of the make-up stream can be returned through recycle line 122 to the reactor, for example at inlet 126 below the bed. Preferably, there is a gas distributor plate 128 above the point of return to aid in fluidizing the bed uniformly and to support the solid particles prior to start-up or when the system is shut down. The stream passing upwardly through and out of the bed helps remove the heat of reaction generated by the exothermic polymerization reaction.

The portion of the gaseous stream flowing through the fluidized bed which did not react in the bed becomes the recycle stream which leaves the reaction zone 112 and passes into the velocity reduction zone 114 above the bed where a major portion of the entrained particles drop back onto the bed thereby reducing solid particle carryover.

The recycle stream is then compressed in compressor 130 and passed through heat exchanger 124 where the heat of reaction is removed from the recycle stream before it is returned to the bed. Note that the heat exchanger 124 can also be positioned before the compressor 130. An illustrative heat exchanger 124 is a shell and tube heat exchanger, with the recycle gas traveling through the tubes.

The recycle stream exiting the heat exchange zone is then returned to the reactor at its base 126 and thence to the fluidized bed through gas distributor plate 128. A fluid flow deflector 132 is preferably installed at the inlet to the reactor to prevent contained polymer particles from settling out and agglomerating into a solid mass and to maintain entrained or to re-entrain any particles or liquid which may settle out or become disentrained.

In this embodiment, polymer product is discharged from line 144. Although not shown, it is desirable to separate any fluid from the product and to return the fluid to the reactor vessel 110.

In accordance with an embodiment of the present invention, the polymerization catalyst enters the reactor in solid or liquid form at a point 142 through line 148. If one or more co-catalysts are to be added, as is often the case, the one or more cocatalysts may be introduced separately into the reaction zone where they will react with the catalyst to form the catalytically active reaction product and/or affect the reaction proceeding in the reactor system. However the catalyst and cocatalyst(s) may be mixed prior to their introduction into the reaction zone.

A continuity additive may be added in situ to the reactor system 100 via an appropriate mechanism such as feed line 148 or another feed line 150.

The reactor shown in FIG. 4 is particularly useful for forming polyolefins such as polyethylene, polypropylene, etc. Process conditions, raw materials, catalysts, etc. for forming various polyolefins and other reaction products are found in the references incorporated herein. Illustrative process conditions for polymerization reactions in general are listed below to provide general guidance.

The reaction vessel, for example, has an inner diameter of at least about 2 feet, and is generally greater than about 10 feet, and can exceed 15 or 17 feet.

The reactor pressure in a gas phase process may vary from about 100 psig (690 kPa) to about 600 psig (4138 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C. In one approach, the reactor temperature is less than about 40° C., 30° C., more preferably less than about 20° C., and even more preferably less than about 15° C. below the melting point of the polyolefin being produced. The process can run at even higher temperatures, e.g., less than about 10° C. or 5° C. below the melting point of the polyolefin being produced. Polyethylene, for example, has a melting point in the range of approximately 125° C. to 130° C.

The overall temperature in a gas phase process typically varies from about 30° C. to about 125° C. In one approach, the temperature at the point of highest temperature in the reactor system is less than about 30° C., more preferably less than about 20° C., and even more preferably less than about 15° C. below the melting point of the polyolefin being produced. In a system such as that shown in FIG. 4, the point of highest temperature is typically at the outlet of the compressor 130.

Other gas phase processes contemplated include series or multistage polymerization processes. Also gas phase processes contemplated by the invention include those described in U.S. Pat. Nos. 5,627,242, 5,665,818 and 5,677,375, and European publications EP-A-0 794 200, EP-B1-0 649 992, EP-A-0 802 202, and EP-B-634 421 all of which are herein fully incorporated by reference.

In any of the embodiments described herein, the gas phase process may be operated in a condensed mode, where an inert condensable fluid is introduced to the process to increase the cooling capacity of the reactor system. These inert condensable fluids are referred to as induced condensing agents or ICA's. For further details of a condensed mode processes see U.S. Pat. Nos. 5,342,749 and 5,436,304, which are herein fully incorporated by reference.

In an embodiment, the reactor utilized in embodiments of the present invention is capable of producing greater than 500 lbs of polymer per hour (227 Kg/hr) to about 300,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Figure 5:
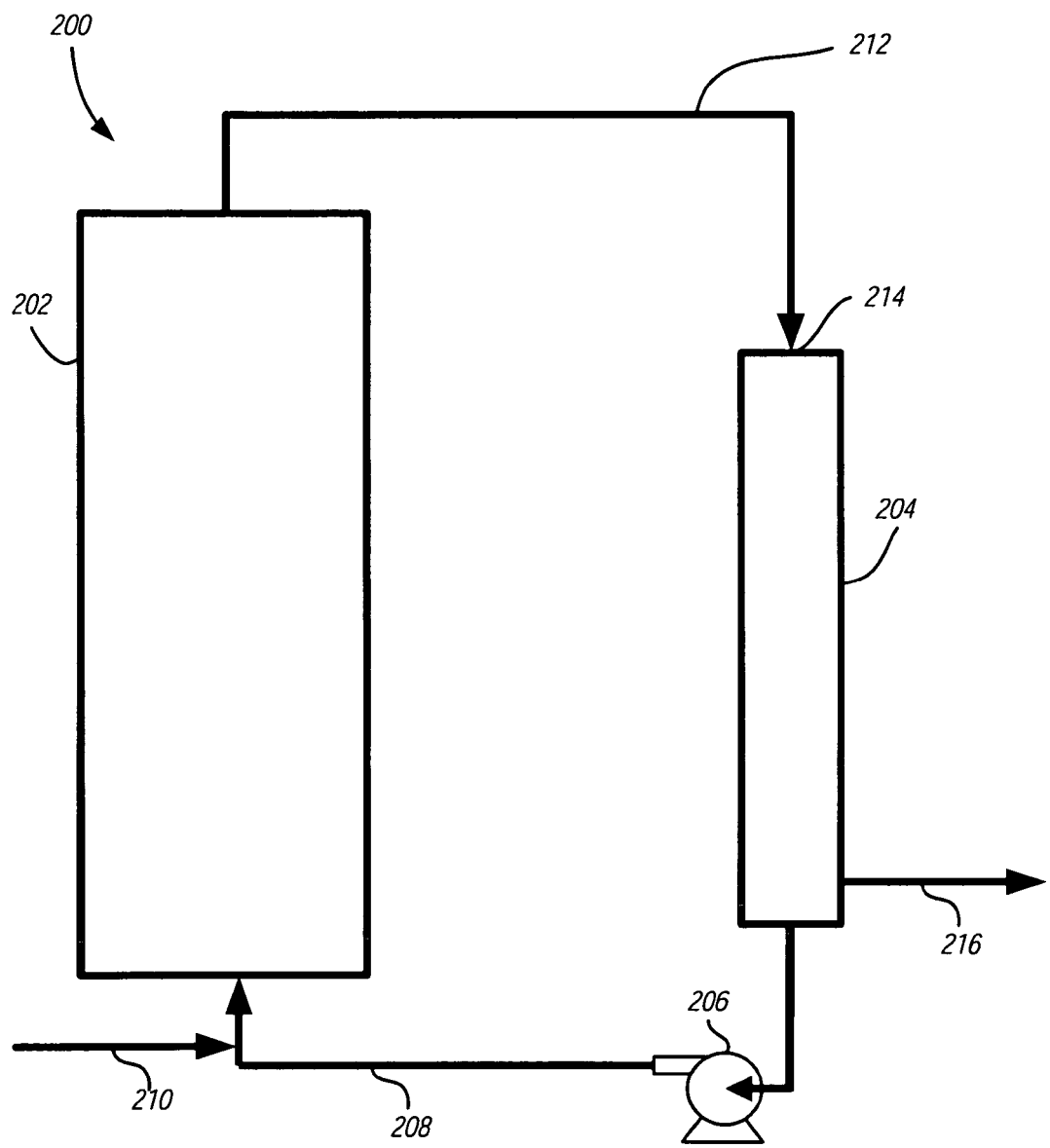
FIG. 5 is a schematic representation of the general methods, systems and/or apparatus of certain embodiments of the invention illustrating implementation in a gas phase polymerization reactor system.

Another illustrative fluidized bed polymerization reactor system 200 is shown in FIG. 5. As shown, the system 200 is a recirculating system including a fast riser 202, a downcomer 204, and a recirculating pump 206. The monomer(s) and catalyst are added to recycle line 208 via feed 210. In this type of system, the polymerization product is formed primarily in the fast riser 202, but continues to form throughout the system. Polymer particles formed in the fast riser 202 pass through line 212 to an upper inlet port 214 of the downcomer 204. The polymer particles gather in the downcomer, where they move downwardly in a dense, slow moving bed. The bed formed in the downcomer can be considered a fluidized bed. Particulate polymer product is discharged from line 216. Although not shown, it is desirable to separate any fluid from the product and to return the fluid to the reactor system 200.

Other Reactor Systems

Slower moving masses of particles, while considered "fluidized" for purposes of embodiments of the invention, are also referred to in the art as "moving beds." Moving beds include particles in such things as mass flow bins, downcomers, etc. where solids are slowly moving through a vessel.

Stirred bed system, while considered "fluidized" for purposes of embodiments of the invention, include beds stirred or otherwise agitated by a member such as a paddle or plunger rotating or moving through the bed (e.g., stirred bed reactor, blender, etc.). Other types of stirred bed systems can be formed by a rotating drum (e.g., with or without internal baffles to enhance mixing), a vessel moving in a see-saw manner, agitation including ultrasonic vibrations applied to the particles or their container, etc.

Liquid Phase Reactor Systems

Figure 6:
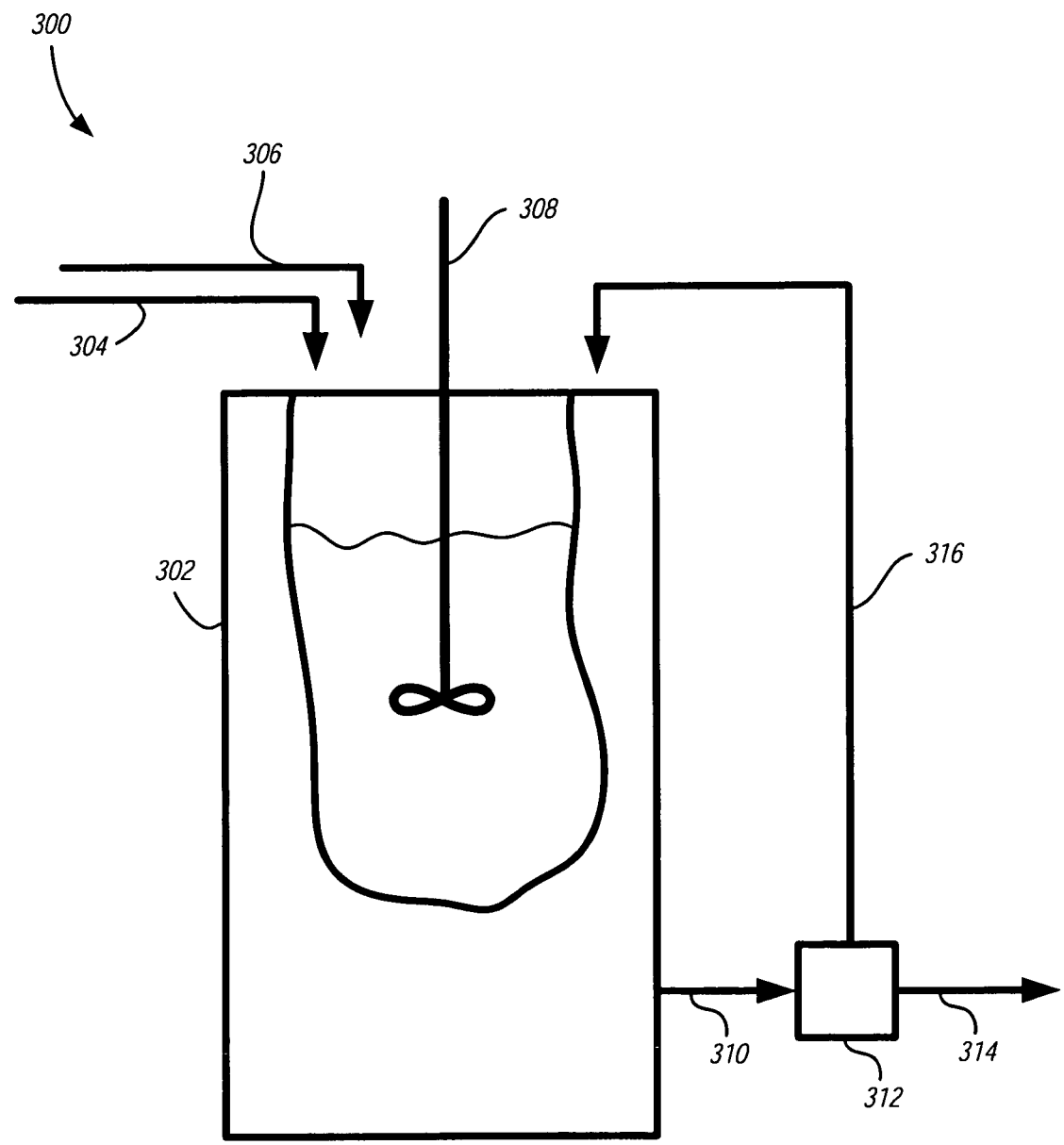
FIG. 6 is a schematic representation of the general methods, systems and/or apparatus of certain embodiments of the invention implementation in a liquid phase polymerization reactor system.

In each of the aforementioned generally preferred approaches and/or embodiments, the reactor may form part of a liquid phase reactor system. Referring to FIG. 6, a liquid phase polymerization system 300, such as a slurry, suspension or solution reactor system, according to one approach generally comprises a reactor vessel 302 to which an olefin monomer and a catalyst composition are added, such as via feed lines 304 and 306, respectively, or as a mixture combined prior to addition to the reactor vessel 302. Additional materials can be fed to the reactor vessel 302 via feed lines 304, 306, or an additional feed line or lines. The reactor vessel 302 typically contains a liquid reaction medium for dissolving and/or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Slurry or solution polymerization systems may utilize subatmospheric or superatmospheric pressures and temperatures in the range of about 40° C. to about 300° C. A useful liquid phase polymerization system is described in U.S. Pat. No. 3,324,095, which is herein incorporated by reference.

Reactive contact between the olefin monomer and the catalyst composition may be maintained by constant stirring or agitation, e.g., by a member such as a paddle 308 or plunger rotating or moving through the reactor vessel 302 (e.g., stirred reactor, blender, etc.). Other types of liquid phase polymerization systems can be formed by a rotating drum (e.g., with or without internal baffles to enhance mixing), a vessel moving in a see-saw manner, agitation including ultrasonic vibrations applied to the materials or vessel, etc.

The reaction medium containing the olefin polymer product and unreacted olefin monomer is withdrawn from the reactor vessel 302 continuously via outlet line 310. The olefin polymer product is separated by separator 312, and moved from the system via line 314. The unreacted olefin monomer and liquid reaction medium are recycled into the reactor vessel 302 via recycle line 316.

Polymer Products

The term "polymer" as used herein refers to a macromolecular compound prepared by polymerizing monomers of the same or a different type. A polymer refers to homopolymers, copolymers, terpolymers, interpolymers, and so on. The term "interpolymer" used herein refers to polymers prepared by the polymerization of at least two types of monomers or comonomers. It includes, but is not limited to, copolymers (which usually refers to polymers prepared from two different monomers or comonomers), terpolymers (which usually refers to polymers prepared from three different types of monomers or comonomers), and tetrapolymers (which usually refers to polymers prepared from four different types of monomers or comonomers), and the like. The term "monomer" or "comonomer" refers to any compound with a polymerizable moiety which is added to a reactor in order to produce a polymer. The term "polyolefin" refers to any polymer containing an olefinic monomer.

In each of the aforementioned generally preferred approaches and/or embodiments, the polymers may be produced from monomers selected from ethylene, propylene, 1-butene, 1-hexene, 1-pentene, 4-methyl-1-pentene, 1-octene, 1-decene, vinyl-cyclohexene, styrene, ethylidene norbornene, norbornadiene, 1,3-butadiene, 1,5-hexadiene, 1,7-octadiene, 1,9-decadiene, or a combination thereof. The polymers may be homopolymers of ethylene or copolymers of ethylene with one or more $C_3$-$C_{20}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene copolymer preferably has at least one other alpha-olefin comonomer having at least four carbon atoms in an amount of at least 1 percent by weight of the polymer. Accordingly, ethylene/propylene copolymers are possible.

Polymerization conditions generally refer to temperature, pressure, monomer content (including comonomer concentration), catalyst concentration, cocatalyst concentration, activator concentration, etc., that influence the molecular weight of the polymer produced. The weight-average molecular weight ($M_w$) of a homopolymer, copolymer, or other interpolymer can be measured by gel permeation chromatography as described in U.S. Pat. No. 5,272,236, which is incorporated by reference herein in its entirety. For ethylene polymers or interpolymers, one method to determine the molecular weight is to measure the melt index according to ASTM D-1238 Condition 190° C./2.16 kg (formerly known as "Condition E" and also known as "I2"). Generally, melt index ($I_2$) is inversely related to the molecular weight of an ethylene polymer. The higher the molecular weight, the lower the melt index ($I_2$), although the relationship is not necessarily linear. Another measurement used in characterizing the molecular weight of ethylene polymers involves measuring the melt index with a higher weight in accordance with ASTM D-1238, Condition 190° C./21.6 kg (formerly known as "Condition F" and also known as "I21"). Melt Flow Ratio (MFR) is defined herein as the ratio of the flow index (FI or $I_{21}$) divided by the melt index ($I_2$), i.e., $I_{21}/I_2$. Molecular weight distribution is the weight average molecular weight ($M_w$) divided by number average molecular weight (Mn), i.e., $M_w$/Mn.

In one preferred approach, the polymer is suitable for blow molding applications. Generally, high performance blow molding resins have a bimodal molecular weight distribution. This means that the resin comprises at least two polymer components, one of the at least two components having a higher average molecular weight (sometimes referred to as the "HMW polymer component") than another of the at least two components (sometimes referred to as the "LMW polymer component").

In one particularly preferred approach, polyethylene suitable for blow molding is produced. The properties of such polyethylene may include a flow index range between about 10 and about 50 dg/min, more preferably between about 20 and about 40 dg/min. The MFR of the resin may vary from greater than about 250 to less than about 100 ($I_{21}/I_2$), preferably between about 250 and 100 ($I_{21}/I_2$), more preferably centered around 150 ($I_{21}/I_2$). The density of such polyethylene resins may be less than about 1 g/cc, preferably between about 0.9 and about 1.0 g/cc, more preferably between about 0.955 and about 0.960 g/cc.

In general, for example, the reactor systems and methods described herein can be used in connection with liquids and/or gases having a wide range of fluid properties, such as a wide range of viscosities, densities and/or dielectric constants (each such property being considered independently or collectively as to two or more thereof). For example, liquid fluids can generally have viscosities ranging from about 0.1 cP to about 100,000 cP, and/or can have densities ranging from about 0.0005 g/cc to about 20 g/cc and/or can have a dielectric constant ranging from about 1 to about 100. In many embodiments of the invention, the bulk material is a gaseous fluid. Gaseous fluids can, for example, generally have viscosities ranging from about 0.001 to about 0.1 cP, and/or can have densities ranging from about 0.0005 to about 0.1 g/cc and/or can have a dielectric constant ranging from about 1 to about 1.1.

The bulk material can include relatively pure gaseous elements (e.g., gaseous $N_2$, gaseous $H_2$, gaseous $O_2$). Other components can include relatively pure liquid, solid, or gaseous compounds (e.g., liquid or solid catalyst, gaseous monomer, air). The various systems of embodiments of the invention can also include single-phase or multi-phase mixtures of gases, solids and/or liquids, including for example: two-phase mixtures of solids and gases (e.g., fluidized bed systems), mixtures of gasses with a single type of particle, mixtures of gasses with different types of particles (e.g., polymer and catalyst particles); and/or three-phase mixtures of gasses, liquids and solids (e.g., fluidized bed with liquid catalyst being added). Particular examples of preferred fluids are described herein, including in discussion below regarding preferred applications of the methods and devices of embodiments of the invention.

Catalyst Systems

In each of the aforementioned generally preferred approaches and/or embodiments, a bicomponent catalyst system is used. The term "bicomponent catalyst system" as used herein means catalyst systems having at least two catalyst components, and may indeed include catalyst systems including several different catalyst components.

For example, the bicomponent catalysts system may include at least one Group 15 containing metal compound such as bis(2,3,4,5,6-pentamethylphenyl amido ethyl)anine zirconium dibenzyl and at least one metallocene compound such as bis(n-butylcyclopentadienyl)zirconium dichloride or tetramethylcyclopentadienyl)(n-propylcyclopentadienyl)zirconium dichloride.

In one approach, bicomponent catalyst systems may include catalyst systems where differing catalysts are present on a single support.

In another approach, bicomponent catalyst systems may include systems where catalysts are not on a single support. Such catalyst systems may include mixtures of catalysts in a common carrier, as well as catalysts independently fed to the reactor system.

In a further approach, one or more catalysts are employed along with a catalyst system having differing catalysts present on a single support.

For simplicity, much of the present description will refer to a catalyst system containing two catalyst components. However, it should be kept in mind that the teachings herein extend to embodiments where the bicomponent catalyst system includes more than two catalyst components.

In some embodiments, the first catalyst is a high molecular weight catalyst and the second catalyst is a low molecular weight catalyst. Alternatively, the first catalyst is a low molecular weight catalyst and the second catalyst is a high molecular weight catalyst.

A high molecular weight catalyst and a low molecular weight catalyst are determined with reference to each other. One does not know whether a catalyst is a high molecular weight catalyst or a low molecular weight catalyst until after another catalyst is also selected. Therefore, the terms "high molecular weight" and "low molecular weight" used herein when referring to a catalyst are merely relative terms and do not encompass any absolute value with respect to the molecular weight of a polymer. After a pair of catalysts are selected, one can easily ascertain which one is the high molecular weight catalyst by the following procedure: 1) select at least one monomer which can be polymerized by the chosen catalysts; 2) make a polymer from the selected monomer(s) in a single reactor containing one of the selected catalysts under pre-selected polymerization conditions; 3) make another polymer from the same monomer(s) in a single reactor containing the other catalyst under substantially the same polymerization conditions; and 4) measure the melt index $I_2$ for the respective interpolymers. The catalyst that yields a lower $I_2$ is the higher molecular weight catalyst. Conversely, the catalyst that yields a high $I_2$ is the lower molecular weight catalyst. Using this methodology, it is possible to rank a plurality of catalysts based on the molecular weight of the polymers they can produce under substantially the same conditions. As such, one can select three, four, five, six, or more catalysts according to their molecular weight capability and use these catalysts simultaneously in a single polymerization reactor to produce polymers with tailored structures and properties.

In some embodiments, the high molecular weight catalysts and the low molecular weight catalysts are selected such that they have different productivity and chain transfer agent responses. In other words, under substantially the same conditions, the catalysts will react differently to a temperature change and/or the addition of a chain transfer agent into the system.

Due to the intrinsic molecular weight differences in the polymer produced by the chosen high and low molecular weight catalyst, the polymer produced by the two catalysts in a single reactor has a high molecular weight fraction and a low molecular weight fraction. Such a phenomenon is referred to herein after as "polymer split." A polymer split is defined as the weight fraction of the high molecular weight polymer component in a polymer with such split. The relative fraction of the high molecular weight component can be measured by deconvoluting a gel permeation chromatography ("GPC") peak. One characteristic of the process described herein is that the polymer split can be varied from 0 to 100% by adjusting the ratio of the high molecular weight catalyst to the low molecular weight catalyst. Because any two catalysts can exhibit different catalytic efficiency at a given set of polymerization process conditions, the polymer split may not correspond directly to the molar ratio of the two catalysts.

Due to the complex dependence of melt/flow properties on the position and shape of a polymer molecular weight distribution, the method to make a polymer with a target melt flow index and melt flow rate requires more than one variable. Based on the productivity of the catalyst and the reaction to a chain transfer agent, temperature and amount of chain transfer agent are used in a coordinated scheme to target the melt index and melt flow ratio of resin produced with the catalyst system.

The catalyst compounds which may be utilized in the catalyst compositions of the invention include invention include: Group 15 containing metal compounds; metallocene compounds; phenoxide catalyst compounds; additionally discovered catalyst compounds; and conventional-type transition metal catalysts. Several suitable catalysts and methods for preparing catalysts are described in U.S. Pat. No. 6,846,886, which is herein incorporated by reference to the extent that definitions therein do not conflict with the stated or implied definitions presented herein.

Any catalyst system in which the two (or more) catalyst components have substantially different chain transfer agent responses may be used. The catalyst system can be a Ziegler-Natta catalyst combined with a single site catalyst, two Ziegler-Natta catalysts, or two single site catalysts. In a preferred embodiment, the catalyst system is made up of two Ziegler-Natta catalysts. In a preferred embodiment, the Ziegler-Natta catalysts have titanium and hafnium active catalyst sites.

U.S. Pat. Application Pub. No. US2005/0228138A1 to Davis et al., which is herein incorporated by reference to the extent that definitions therein do not conflict with the stated or implied definitions presented herein, discloses several bicomponent catalyst systems which may be implemented in various embodiments of the present invention.

The use of polyselective catalysts is not limited to the catalysts described in the above enumerated publications, which does not represent an exhaustive list of such known olefin polymerization catalysts. As a method for targeting the composite product of a catalyst system is described, two or more polyselective catalysts are used. A biselective catalyst is one which has two different types of polymerization catalyst species in the same catalyst composition; a polyselective catalyst is one which has two or more different types of polymerization species in the same catalyst composition. Most often, this means that two species are present on the same support. Less frequently, the support itself acts as one of the active catalyst species, and supports a different catalyst species. In either case, since the two species are present in the same composition, and polymerizes the olefin(s) simultaneously, there is little or no chance that resin particles are made including only one mode of resin product. In a preferred embodiment, the weight ratio of the first catalyst component to the second catalyst component remains substantially the same during the polymerization process.

For controlling bimodal molecular weights, a method employing two mixed (biselective) catalyst compositions may be used. For instance, if one biselective catalyst blend independently generates a product with a 70% HMW, 30% LMW split and the other generates a 50% HMW, 50% LMW product, the range of products possible for all relative catalyst feed rates would be from 50 to 70% HMW, compared to a range of 0 to 100% if separate HMW and LMW producing feeds are used. This restriction in the range of possible products significantly reduces the sensitivity of the overall system to perturbations in relative catalyst feed flow rates. In a preferred embodiment, the polymer comprises no more than 50 wt % of the HMW fraction. In an alternate embodiment, the polymer comprises no more than 30 wt % of the HMW fraction. In an alternate embodiment, the polymer comprises no more than 10 wt % of the HMW fraction.

The feed rates of catalyst compositions A and B can be manipulated in response to continuous or intermittent measurements, or a process model, of the desired product property or properties. The ratio of catalyst species X to catalyst species Y in a given biselective catalyst composition can be selected to provide a specific ratio of product having the property, or value thereof, of interest under a known set of polymerization conditions. The catalyst composition can then be referred to as one which provides a predetermined content, or "split," of, for example, high molecular weights compared to the overall product, which can differ from the weight or molar ratio of the metal components of the catalyst composition. In a preferred embodiment, the feed rates of catalyst compositions A and B remain substantially the same during steady state polymerization. In other words, the weight ratio of the first catalyst to the second catalyst remains substantially the same during the polymerization process.

In principle, any two biselective or other polyselective catalyst compositions can be used, so long as they have an acceptable degree of effectiveness in imparting the property or properties desired. Typically they are bimetallic or polymetallic, but they can be biselective or polyselective for reasons other than the type of metal polymerization site. For example, the catalyst components can respond to different promoters or modifiers, and/or they can respond to chain terminators such as hydrogen in different ways or in different degrees.

Some bimetallic catalysts employed in some approaches contain at least two transition metals, one in the form of a metallocene and one transition metal in the form of a non-metallocene, and have an activity of at least about 1000 g polymer/g catalyst or about 50 kg polymer/g of each transition metal. The bimetallic catalysts are typically free of water.

Because of the different chain transfer agent response of each of the two sources of transition metals in the bimetallic catalyst, each produces a different molecular weight component under identical olefin polymerization conditions. In some embodiments, the metal of highest hydrogen response is present in amounts of about 0.1 to about 0.8 weight percent; in preferred embodiments that metal is hafnium. The metal of lowest hydrogen response may be present in amounts of about 0.5 to about 3.0 weight percent; in preferred embodiments that metal is titanium. This catalyst system is catalytically effective to produce bimodal molecular weight distribution product containing about 0.05 to about 0.95 weight percent of the high molecular weight component. In a typical product of this catalyst, about 20% of the polyethylene is produced by the hafnium sites, and about 80% is produced by the titanium sites.

In bimodal molecular weight distribution products, the weight fraction of the HMW component should be in the range of about 0.05 to about 0.95, more preferably from about 0.10 to about 0.90 for applications requiring broad molecular weight distribution resins. The flow index (FI) of the bimodal molecular weight product should be in the range of 2 to 100. If the bimodal molecular weight distribution product has an FI of less than 2, the FI is too low for processability. On the other hand, if overall polymer FI is too high, then product toughness properties decrease. Hence, it is necessary to control polymer FI in the polymerization reactor. Product melt flow ratio (MFR) values are preferably in the range of about 30 to about 250. Smaller MFR values indicate relatively narrow molecular weight distribution polymers.

Chain Transfer Agents

In each of the aforementioned generally preferred approaches and/or embodiments, a chain transfer agent is present in the reactor.

Chain transfer agents or telogens are used to control the melt flow index in a polymerization process. Chain transfer involves the termination of growing polymer chains, thus limiting the ultimate molecular weight of the polymer material. Chain transfer agents are typically hydrogen atom donors that react with a growing polymer chain and stop the polymerization reaction of said chain. These agents can be of many different types, from saturated hydrocarbons or unsaturated hydrocarbons to aldehydes, ketones or alcohols, including hydrogen and aluminum alkyls. By controlling the concentration of the selected chain transfer agent, one can control the length of polymer chains, and, hence, the weight average molecular weight, $M_w$. The melt flow index ($I_2$) of a polymer, which is related to $M_w$, may be controlled in the same way.

After the donation of a hydrogen atom, the chain transfer agent can react with the monomers, or with already formed oligomers or polymers, to start a new polymer chain. This means that any functional groups present in chain transfer agents, for instance, carbonyl groups of aldehydes and ketones, are introduced in the polymer chains.

A large number of chain transfer agents, for example, propylene and 1-butene which have an olefinically unsaturated bond, can also be incorporated in the polymer chain themselves via a copolymerization reaction. This generally leads to the formation of short chain branching of respectively methyl and ethyl groups, which lowers the density of the polymers obtained. The chain transfer agent can be hydrogen, water, or carbon dioxide. In a preferred embodiment, the chain transfer agent is hydrogen.

The amount of the chain transfer agent can range from 0.1 to 700,000 ppmv (based on reactor volume), preferably from 100,000 to 500,000 ppmv. When $H_2$ is employed as the chain transfer agent, the hydrogen/ethylene concentration ratio ranges from 0.000001 to 3; preferably 0.0001 to 2 in a gas-phase fluidized bed reactor. Although the chain transfer agent can be added separately, it can also be added as a mixture, a cofeed with ethylene, etc. The presence of the chain transfer agent acts to increase FI. The increase in FI depends on the amount of chain transfer agent employed and the composition of the catalyst system. Increases in FI can range from 10 to 2000%, preferably 20 to 500% over that of a resin produced in the absence of the chain transfer agent.

Operating Conditions

Except where defined herein, the operating conditions of the reactor and other systems are not narrowly critical to the invention. While general operating conditions have been provided above for fluidized bed polymerization reactor systems, fluidized and nonfluidized bed systems can, in addition to those listed above, have widely varying process conditions, such as temperature, pressure, fluid flowrate, etc.

Polymerization conditions generally refer to temperature, pressure, monomer content (including comonomer concentration), catalyst concentration, cocatalyst concentration, activator concentration, etc., that influence the molecular weight of the polymer produced.

A particularly desirable method for producing polyethylene polymers is in a fluidized bed reactor system, such as, but not limited to, one of the general systems described above. The molecular weight of the polymer can be controlled by increasing or decreasing the concentration of the chain transfer agent. Reactor temperature, while affecting the average molecular weight of both the LMW and HMW components, is effective primarily by changing the split of the resin product. A different flow index and melt flow ratio is a consequence of this split change, with the flow index typically decreasing and the MFR typically increasing with an increase in HMW component split. With a Ziegler Natta catalyst of hafnium and titanium, the apparent catalyst productivities of the titanium and hafnium catalyst components differ such that an increase in reactor temperature increases the productivity of the LMW Ti catalyst component much more than that of the hafnium catalyst component, thus decreasing the resin split in products made at higher temperatures.

Temperature is also an effective variable for controlling MFR. Increasing temperature, which, in turn, decreases product MFR, also hampers productivity. This inhibiting effect of temperature is seen in pipe and film production as well as in blow molding. However, in some approaches, the inhibitive effect of higher temperatures is acceptable where the goal is to achieve a particular MFR. In one approach, the temperature of the process ranges from about 30 to about 130° C., more preferably from about 75 to about 130° C., and even more preferably from about 95 to about 110° C.

When a fluidized bed reactor system is employed, the chain transfer agent can be introduced separately from other components, e.g., via independent feed line; or introduced therewith. The chain transfer agent is preferably added continuously to the reactor.

Conventional wisdom was that increasing the concentration of chain transfer agent in the reactor reduces polymer chain length, and thus, the overall MW. Lower molecular weights in turn result in higher flow indexes (polymers with shorter chain lengths are easier to extrude than polymers with longer chain lengths). Consequently, it was believed that reducing hydrogen concentration in the reactor running a bimodal catalyst system would increase product MFR by increasing the spread of the HMW and LMW product components. This may be due to several factors. For example, in some processes performed in the presence of a bicomponent catalyst, the chain transfer agent predominantly decreases the average molecular weight of the LMW component while having a less significant effect on the HMW component. An increase in chain transfer agent decreases the weight fraction of the HMW component to some degree, causing the relative weight fraction of the LMW component to increase (decreasing the split). In other processes, reducing hydrogen during fabrication of materials with a HMW split near 50% or greater increases MFR because polymer properties seem more closely linked with HMW component. The spread might actually decrease with a hydrogen reduction as the MFR goes up. In either case, the decrease in HMW component also typically increases the overall FI of broad or bimodal molecular weight distribution resin.

What has surprisingly been discovered is that at least for certain polyolefins, especially polyolefins suitable for blow molding applications, the MFR relationships with product FI and split are, under some conditions, opposite those previously observed. Particularly, an alternate regime has been discovered whereby, if the chain transfer agent concentration is sufficiently reduced, the MFR and spread trends with chain transfer agent concentration will reverse, leading to the surprising conclusion that, upon reaching a certain split, MFR actually decreases with decreasing chain transfer agent. In other words, when the chain transfer agent is reduced to a certain point, the MFR decreases instead of increases.

Without wishing to be bound by any theory, the cause for this result seems to be related to the change in dominance from the HMW to the LMW component once the chain transfer agent concentration is reduced to a certain level. Particularly, the unusual trend is believed to result from a large difference in component split. One way to understand the difference is to imagine a central split level where MFR is highest. For some common products, the product split is higher than this center level, so decreasing split (which happens if FI is normalized while hydrogen concentration is decreased) will move the split toward the maximum-MFR level, thus increasing MFR. Alternately, e.g., with some blow molding products, where the product split is below the maximum-MFR level. Decreasing hydrogen concentration, e.g., in blow molding polymer production, also causes the split to decrease, but now the split is moving further from the maximum-MFR level, causing the MFR to decrease.

One benefit of this surprising discovery includes allowing flexibility in tuning bimodal blow molding products to make widely varying MFRs at a high flow index and a great range of component splits. For example, the surprising discovery makes creation of materials having a target FI but lower MFR possible, where conventional wisdom was that such materials were not possible.

In one general approach, the concentration of the chain transfer agent in the reactor is altered to move the HMW and LMW peaks in the same direction. Such altering may include increasing or decreasing the concentration of chain transfer agent. The altering also causes the MFR to move in a first direction. At least one condition in the reactor is adjusted to achieve a MW split where the MFR trend reverses direction. Such condition(s) that can be adjusted to change the MW split may include one or more of temperature, pressure, monomer content (including comonomer concentration), catalyst concentration, cocatalyst concentration, activator concentration, etc.

In a particularly preferred approach, the MW split is adjusted by changing relative amounts of the first and second catalyst components in the reactor. The MW split may be adjusted by selectively poisoning one of the catalyst components more than the other catalyst component. The MW split may also be adjusted by selectively activating one of the catalyst components more than the other catalyst component, e.g., by using water to increase productivity of one of the catalyst components. Combinations of the foregoing may also be used.

The altering to move the HMW and LMW peaks in the same direction and adjusting the at least one reactor condition may be performed concurrently, but need not be.

In one preferred approach, the FI of the polymer is maintained at about a target level throughout the process of effectuating the reversal of the MFR trend. The FI of the polymer may be maintained by changing relative amounts of the first and second catalyst components in the reactor. This may be done by adding additional catalyst, changing catalysts, reducing one catalyst component, etc. In one example, when the concentration of the chain transfer agent is decreased, the FI drops. To raise the FI back up, a third catalyst component (which may be the same as the first or second catalyst component, or different therefrom) may be added to affect the split by increasing either the HMW or LMW component of the polymer. The split in turn affects the FI.

By changing the concentration of the chain transfer agent while keeping the FI at about a target level, the overall viscosity of the polymer can be maintained at about a constant level. However, because of the reversal of the MFR trend, the shear thinning property of the polymer (as determined by the MFR) can be tuned in a new way. Because the polymers produced are typically non-Newtonian, the shear viscosity drops with increasing rates of extrusion. This phenomenon is known as shear thinning.

In yet another approach, the overall product FI is changed at least once in the process.

In another general approach to making a polyolefin, one or more olefinic monomers are contacted in a single reactor containing a bicomponent catalyst system comprising a first catalyst component and a second catalyst component each having a catalyst productivity and a chain transfer agent response; the single reactor being having a chain transfer agent concentration; the chain transfer agent response of the second catalyst component having a different sensitivity than that of the first catalyst component. The polymerization of the olefinic monomers is effectuated to produce an olefin polymer having a MFR and a FI, where the first catalyst component produces a HMW fraction of the polymer, and the second catalyst component produces a LMW fraction of the polymer. Reducing the concentration of the chain transfer agent present in the reactor while maintaining about a constant flow index causes the MFR to decrease.

To assist the reader in conceptualizing the foregoing, consider the following example. Assume a blow molding product is being produced in a gas phase fluidized bed polymerization reaction in the presence of a bimodal catalyst. The resin has a high split, and the effect of the chain transfer agent on the process is as conventionally observed. At initial steady state conditions, the resin produced has a FI of "A" and a given split. Assume that next, the chain transfer agent concentration is reduced by a certain amount. This causes the FI to drop below level A. To bring the FI back to level A, more LMW catalyst component is added to the process to increase the LMW portion of the resin. This in turn lowers the split while increasing the MFR. Assume that next, the concentration of chain transfer agent is further reduced. The FI drops more, so more LMW catalyst component is introduced into the system to increase the FI back to level A. Consequently, the split falls further, and the MFR increases again. Assume that next, the concentration of the chain transfer agent is further reduced. Now the MW peaks of the HMW and LMW components of the polymer product are much higher than they were before. As before, more LMW catalyst component is introduced into the system to increase the FI back to level A. As expected the split also falls further. However, the MFR trend reverses and begins to drop, instead of increasing as expected. Thus, when the split reaches a certain point for a given FI, the property relationships of polymer product change.

Those skilled in the art will appreciate that, at a given FI, and using a bimodal catalyst where the two catalysts have different response to a chain transfer agent, the particular split where the MFR trend reverses will vary depending on various polymerization conditions, the type of polymer being created, etc. However, following the teachings set forth herein, those skilled in the art should be readily able to recreate a polymerization where the MFR trend reverses. The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

The polymerization reactions described in the following examples were conducted in a continuous pilot-scale gas phase fluidized bed reactor of 14 inches internal diameter and about 4.6 to about 5.2 feet in bed height. The fluidized bed was made up of polymer granules. The gaseous feed streams of ethylene and hydrogen together with liquid comonomer were introduced below the reactor bed into the recycle gas line. Hexene was used as comonomer in some runs. The individual flow rates of ethylene, hydrogen and comonomer were controlled to maintain fixed composition targets. The ethylene concentration was controlled to maintain a constant ethylene partial pressure of about 220 psia. The hydrogen was controlled to maintain a constant hydrogen to ethylene mole ratio. Comonomer was also controlled to maintain a constant comonomer to ethylene mole ratio (of about 0.0007 for hexene). The concentrations of all the gases were measured by an on-line gas chromatograph to ensure relatively constant composition in the recycle gas stream.

The solid bimodal catalyst was injected directly into the fluidized bed using purified nitrogen as a carrier. Its rate was adjusted to maintain a constant production rate. The reacting bed of growing polymer particles was maintained in a fluidized state by the continuous flow of the make up feed and recycle gas through the reaction zone. Superficial gas velocities of 1.9 to about 2.4 feet/sec was used to achieve this. The reactor was operated at a total pressure of about 349 psig. The reactor was operated at various reaction temperatures of 85-105° C.

The fluidized bed was maintained at a constant height (about 4.6 to about 5.2 feet) by withdrawing a portion of the bed at a rate equal to the rate of formation of particulate product. The rate of product formation (the polymer production rate) was in the range of about 21.2 to about 49.4 lb/hour. The product was removed semi-continuously via a series of valves into a fixed volume chamber.

FIG. 4 is representative of the pilot-scale fluidized bed reactor system used in these examples.

Example 1

Hydrogen Response

Hydrogen ratios tested in the runs varied greatly, ranging from 0.00075 to 0.003 hydrogen/ethylene ratios. The primary reason for changing hydrogen concentration was to modify the product MFR, and results with the blow molding product were unusual compared to pipe and film products created with the same catalyst. Selected MFR results at different hydrogen levels are shown in Table 1.

TABLE 1

MFR values at various $H_2/C_2$ gas composition ratios at or near 30 dg/min flow index.

| $H_2/C_2$ | FI | MFR |
|---|---|---|
| 0.00075 | 27.0 | 109 |
| 0.001 | 30.7 | 186 |
| 0.0015 | 28.8 | 240 |

As shown by the data in Table 1, there is a sensitive dependence of MFR on hydrogen concentration while running the blow molding catalyst. High hydrogen leads to high MFR, opposite the trend typically seen in pipe or film production using the same catalyst.

It was also observed that the MFR is highly sensitive to hydrogen. Moving hydrogen from a 0.00075 hydrogen/ethylene molar gas ratio to a 0.0008 can move MFR 20-40 units. This sensitivity suggests that good hydrogen control will be critical for meeting tight MFR specifications.

Example 2

MFR Values

MFR values from selected product parts are shown in Table 2. Catalyst A is bis(2,3,4,5,6-pentamethylphenyl amido ethyl)anine zirconium dibenzyl. Catalyst B is bis(n-butylcyclopentadienyl)zirconium dichloride. Catalyst C is (tetramethylcyclopentadienyl)(n-propylcyclopentadienyl)zirconium dichloride. Such catalysts are available from Univation Technologies, LLC (Houston, Tex.).

TABLE 2

MFR values for blow molding catalysts at various reaction conditions.

| Run # | Catalyst | Trim | FI ($I_{21}$ dg/min) | MFR | Density | T° (C.) | $H_2/C_2$ |
|---|---|---|---|---|---|---|---|
| 1245-80 | A/C | C | 39 | 320 | 0.958 | 85 | 0.003 |
| 1245-80 | A/B | B | 28 | 180 | 0.956 | 105 | 0.0025 |
| 1245-90 | A/C | B | 33 | 101 | 0.9567 | 105 | 0.00075 |
| 1245-120 | A/C | B | 20.1 | 203 | 0.9577 | 100 | 0.0008 |
| 1245-120 | A/C | B | 24.7 | 137 | 0.958 | 100 | 0.00076 |
| 1245-120 | A/B | B | 21.2 | 160 | 0.9568 | 100 | 0.00075 |

Surprising and unexpected, from Table 2, it is seen that the MFR decreases for a given catalyst as the hydrogen concentration decreases.

What is claimed is:

1. A method for making a polyolefin composition, the method comprising:

contacting one or more olefinic monomers in a single reactor containing a bicomponent catalyst system comprising a first catalyst component and a second catalyst component each having a catalyst productivity and a chain transfer agent response; the single reactor having a chain transfer agent concentration; the chain transfer agent response of the second catalyst component being different from that of the first catalyst component, wherein the bicomponent catalyst system comprises at least one Group 15 containing metal compound;

effectuating the polymerization of the olefinic monomers to produce an olefin polymer having a melt flow ratio; wherein the first catalyst component produces a high molecular weight (HMW) fraction of the polymer, and the second catalyst component produces a low molecular weight (LMW) fraction of the polymer;

altering the concentration of the chain transfer agent present in the reactor to move peaks of the HMW and LMW fractions of the polymer in a same direction, the altering also causing the melt flow ratio of the polymer to change in a first direction;

adjusting at least one condition in the reactor to achieve a change in molecular weight split wherein the change in split causes the melt flow ratio of the polymer to reverse trend and change in a second direction and wherein the change in split maintains the flow index, $I_{21}$, of the polymer at about a target level, wherein flow index $I_{21}$, is measured according to ASTM 1238 (190° C./21.6 kg).

2. The method of claim 1, wherein the chain transfer agent is hydrogen or an aluminum alkyl.

3. The method as recited in claim 1, wherein the change in molecular weight split is achieved by changing relative amounts of the first and second catalyst components in the reactor.

4. The method of claim 1, wherein the altering and adjusting are performed concurrently.

5. The method of claim 1, wherein the adjusting is performed by changing relative amounts of the first and second catalyst components in the reactor.

6. The method of claim 1, wherein the adjusting is performed by selectively poisoning one of the catalyst components more than the other catalyst component.

7. The method of claim 1, wherein the adjusting is performed by selectively activating one of the catalyst components more than the other catalyst component.

8. The method of claim 1, wherein the polymer is an ethylene polymer.

9. The method of claim 1, wherein the first and second catalyst components are present on a single support.

10. The method of claim 1, further comprising adding a third catalyst component.

11. A method for making a polyolefin composition, the method comprising:

contacting one or more olefinic monomers in a single reactor containing a bicomponent catalyst system comprising a first catalyst component and a second catalyst component each having a catalyst productivity and a chain transfer agent response; the single reactor having a chain transfer agent concentration; the chain transfer agent response of the second catalyst component being different from that of the first catalyst component, wherein the bicomponent catalyst system comprises at least one Group 15 containing metal compound; and effectuating the polymerization of the olefinic monomers to produce an olefin polymer having a melt flow ratio and a flow index; wherein the first catalyst component produces a high molecular weight (HMW) fraction of the polymer, and the second catalyst component produces a low molecular weight (LMW) fraction of the polymer;

reducing the concentration of the chain transfer agent present in the reactor; and adjusting at least one condition in the reactor to achieve a change in molecular weight split wherein the change in split causes the melt flow ratio of the polymer to reverse trend and change in a second direction while maintaining about a constant flow index $I_{21}$, wherein flow index, $I_{21}$, is measured according to ASTM 1238 (190° C./21.6 kg).

12. The method of claim 11, wherein the chain transfer agent is hydrogen or an aluminum alkyl.

13. The method of claim 11, wherein the flow index of the polymer is maintained by changing relative amounts of the first and second catalyst components in the reactor.

14. The method of claim 11, wherein adjusting at least one condition in the reactor to change the molecular weight split comprises increasing the amount of the low molecular weight fraction of the polymer.

15. The method of claim 11, wherein the adjusting is performed by changing relative amounts of the first and second catalyst components in the reactor.

16. The method of claim 11, wherein the adjusting is performed by selectively poisoning one of the catalyst components more than the other catalyst component.

17. The method of claim 11, wherein the adjusting is performed by selectively activating one of the catalyst components more than the other catalyst component.

18. The method of claim 11, wherein the polymer is an ethylene polymer.

19. The method of claim 11, wherein the first and second catalyst components are present on a single support.

20. The method of claim 11, further comprising adding a third catalyst component.

* * * * *